United States Patent [19]

Qiu et al.

[11] Patent Number: 5,615,254
[45] Date of Patent: Mar. 25, 1997

[54] METHODS AND SYSTEMS FOR DYNAMIC ROUTING IN A SWITCHED COMUNICATION NETWORK

[75] Inventors: Yuping Qiu, Louisville; Jennifer Ryan, Boulder; Xiaorong Sun, Superior; George B. Pillsbury, Lyons; Alex Stevens; Rudy Zubiate, both of Boulder, all of Colo.

[73] Assignee: U S West Technologies, Inc., Boulder, Colo.

[21] Appl. No.: 416,255

[22] Filed: Apr. 4, 1995

[51] Int. Cl.⁶ .............................. H04M 3/36; H04M 7/06
[52] U.S. Cl. .................... 379/221; 379/207; 379/201; 379/220; 379/229; 379/230
[58] Field of Search .................... 379/220, 221, 379/229, 230, 201, 207

[56] References Cited

U.S. PATENT DOCUMENTS

| | | | |
|---|---|---|---|
| 4,284,852 | 8/1991 | Szybicki et al. | 379/221 |
| 4,565,903 | 1/1986 | Riley | 379/220 |
| 4,669,113 | 5/1987 | Ash et al. | 379/221 |
| 4,704,724 | 11/1987 | Krishnan et al. | 379/220 |
| 4,756,019 | 7/1988 | Szybicki | 379/221 |
| 4,788,721 | 11/1988 | Krishnan et al. | 379/221 |
| 4,931,941 | 6/1990 | Krishnan | 379/221 |
| 4,979,118 | 12/1990 | Kheradpir | 379/220 |
| 4,991,204 | 2/1991 | Yamamoto et al. | 379/221 |
| 5,042,027 | 8/1991 | Takase et al. | 379/221 |
| 5,068,892 | 11/1991 | Livanos | 379/221 |
| 5,099,235 | 3/1992 | Crookshanks | 340/826 |
| 5,101,451 | 3/1992 | Ash et al. | 379/221 |
| 5,142,570 | 8/1992 | Chaudhary et al. | 379/221 |
| 5,155,851 | 10/1992 | Krishnan . | |
| 5,281,963 | 1/1994 | Ishikawa et al. | 340/825.5 |
| 5,291,552 | 3/1994 | Kerrigan et al. | 379/220 |
| 5,295,183 | 3/1994 | Langlois et al. | 379/221 |
| 5,311,585 | 5/1994 | Armonstrong et al. | 379/221 |
| 5,335,268 | 8/1994 | Kelly, Jr. et al. | 379/220 |
| 5,345,503 | 9/1994 | Lee | 379/221 |

OTHER PUBLICATIONS

Cameron, Dynamic Routing Dor Intercity Telephone Netowrks, Tenth Internationak Teletraffic Congress, Montreal, Jun. 1983, Section# 3.2. Jun. 1983.

Primary Examiner—Krista M. Zele
Assistant Examiner—Daniel S. Hunter
Attorney, Agent, or Firm—Brooks & Kushman

[57] ABSTRACT

Methods and systems of traffic routing in a circuit switched communication network having a plurality of switches and a plurality of trunk groups connecting the switches are disclosed. The methods include a step of determining a set of alternate routing paths for each of a plurality of ordered pairs of the switches, wherein the number of alternate routing paths through each of the trunk groups is constrained to be less than a corresponding first predetermined threshold. In one embodiment, the alternate routing paths are determined by computing a solution to a predetermined integer programming problem. In another embodiment, a heuristic technique is used to determine the alternate routing paths.

6 Claims, 2 Drawing Sheets

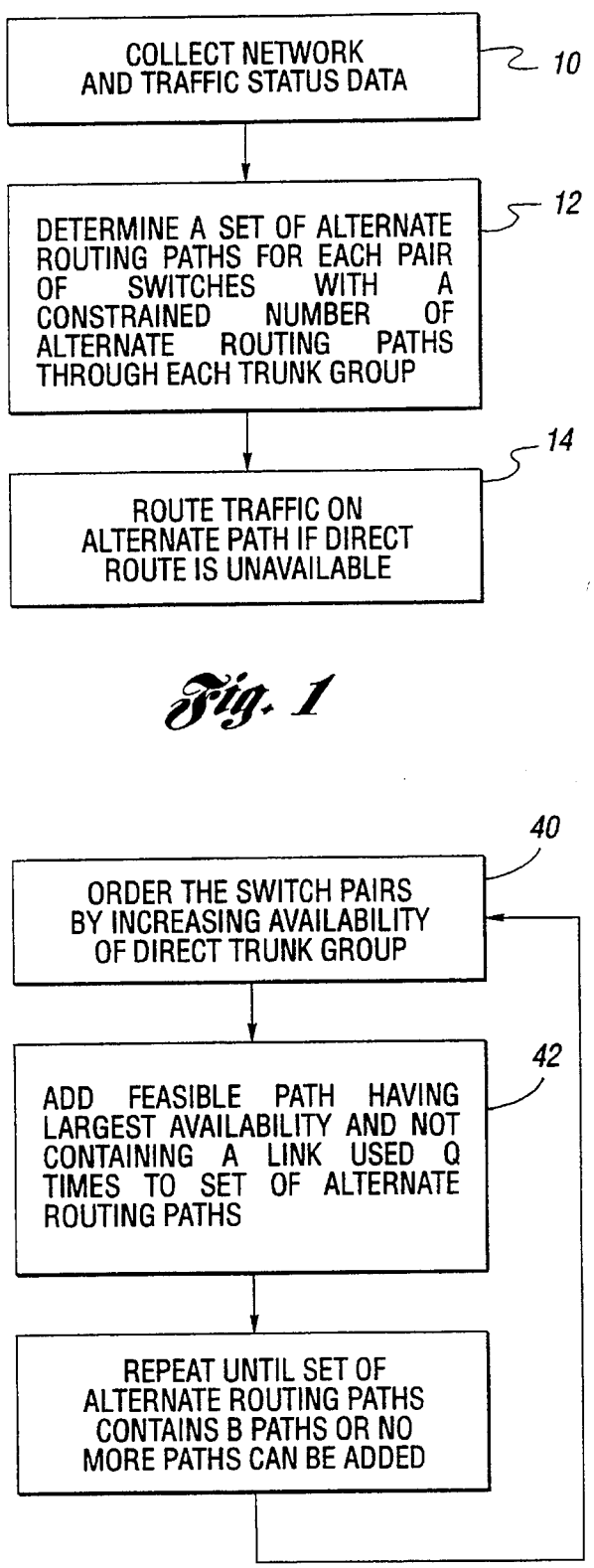
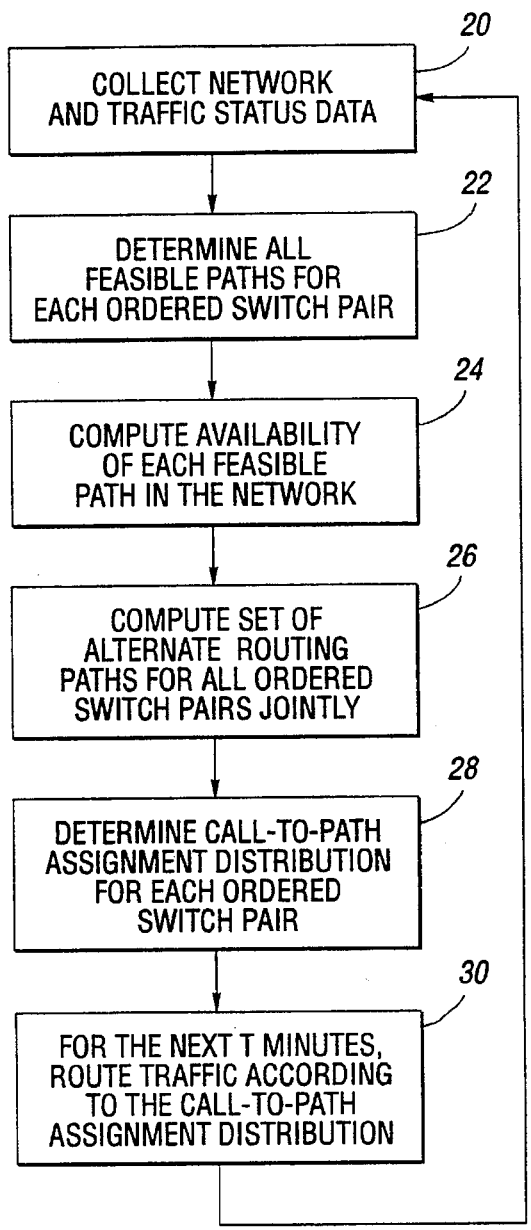

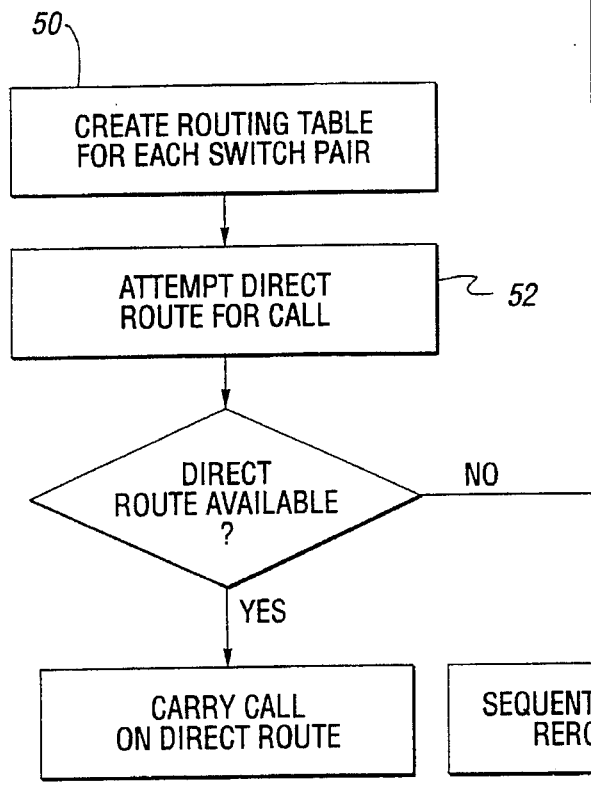
Fig. 4
| ROUTING PATHS FOR SWITCH PAIRS (i, j) ||
|---|---|
| DIRECT ROUTE | i-j |
| REROUTE PATH #1 | i-v-j |
| REROUTE PATH #2 | i-u-j |
| REROUTE PATH #3 | i-v-j |
Fig. 5
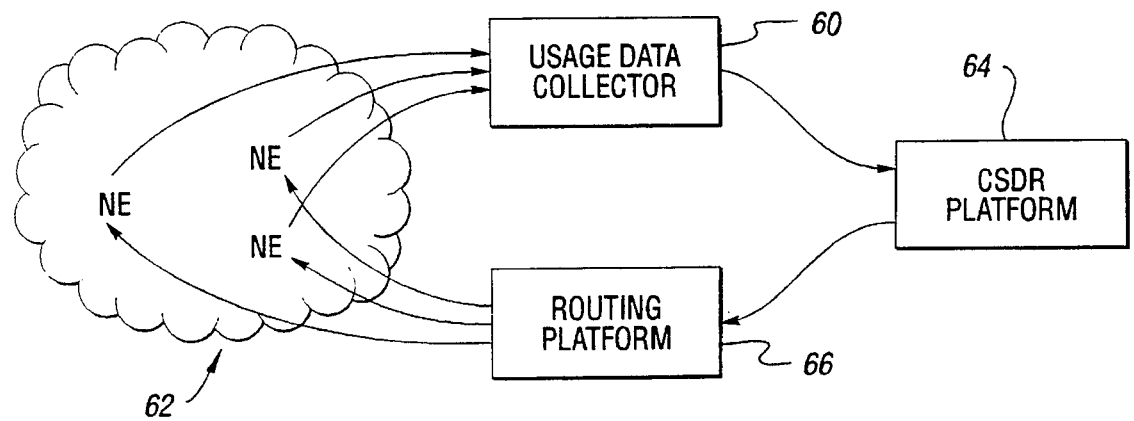
Fig. 6

METHODS AND SYSTEMS FOR DYNAMIC ROUTING IN A SWITCHED COMUNICATION NETWORK

TECHNICAL FIELD

The present invention relates to methods and systems for traffic routing in a circuit switched communication network.

BACKGROUND ART

Circuit switching is a well known paradigm wherein a physical circuit is established between two terminating endpoints of a switched communication network to provide a communication path therebetween. A circuit switched network in accordance with this paradigm, such as a typical circuit switched telephone network, comprises a plurality of switches and a plurality of trunk groups which connect the switches. In practice, the environment of the circuit switched network is heterogeneous in that the switches may be of different types (e.g. 1AESS, 5ESS, DMS100) and the trunk groups may use different signaling methods (e.g. SS7 and multifrequency).

The switches are connected to the trunk groups in a manner such that there are numerous routing paths between each pair of switches. In practice, the network is either fully-connected or nearly fully-connected. Traffic routing methods are employed in the network for selecting at least one of the paths to provide a physical circuit between a pair of switches. The selected path is based upon data representative of network traffic and at least one predetermined measure of network performance. The traffic routing method attempts to improve the at least one predetermined measure of network performance based upon the network traffic data.

Because of some inherent limitations in the switches, the network traffic data can only be collected from the switches at periodic time intervals. In practice, the network traffic data is collected from the switches at constant time intervals, such as every 5 minutes or every 10 minutes. Hence, a routing path which is optimal for the predetermined measure of network performance cannot be calculated or implemented on a call-by-call basis. The routing optimization can only be performed every T minutes by updating the routing tables at the switches based on the current network traffic status.

Existing state-dependent dynamic routing methods calculate alternate routing paths for each switch pair independently, based upon an average trunk group usage during a previous time interval. The alternate routing paths are ordered, and are attempted sequentially by each call between that switch pair. Using these methods, it is likely that a trunk group having little traffic in the current time interval is used by many alternate routing paths of different switch pairs. Consequently, such a trunk group could become congested in the next time interval. Once it becomes congested, the traffic would be diverted in a subsequent time interval. This leads to the possibility of a cycle occurring.

Examples of existing state-dependent dynamic routing methods are disclosed in U.S. Pat. Nos. 4,669,113 (Ash et al.), 4,704,724 (Krishnan et al.), 5,068,892 (Liranos), 5,101,451 (Ash et al.), and 5,295,183 (Langlois et al.).

U.S. Pat. No. 4,669,113 to Ash et al. discloses a method and a system for dynamical non-hierarchical routing in a telecommunication switching network. Each switch in the network sends idle trunk information to a network controller on a periodic basis when idle trunks are created or removed. This information augments traffic information, which is regularly sent to the network controller, used in developing a plurality of routing path choices. The traffic information includes the number of attempts, the number of blocked calls, and usage counts associated with each originating switch-terminating switch pair. The path choices are ordered based upon a least loaded path approach.

U.S. Pat. No. 4,704,724 to Krishnan et al. discloses a separable, state-dependent routing technique wherein a cost of adding an additional call to a trunk group having calls already in progress is determined for each trunk group. The cost of a multi-link group is the sum of the costs of the trunk groups on the route. For each call, the cost of each potential route is calculated, and the call is carried on the least-cost route.

U.S. Pat. No. 5,068,892 to Livanos recognizes the possibility of prior art systems creating conflicting network management data where a circuit group is to be used for a number of different alternative routes. A method is disclosed wherein a number of reservation levels are defined an alternately-routed traffic is controlled when the number of idle circuits in a route falls below a predetermined number. When the number of idle circuits falls below a second level, both directly-routed and alternately-routed traffic on a route are made subject of control. When an excessive number of circuits, relative to the number of idle circuits, are occupied by incoming traffic, incoming load control may be activated to control incoming traffic from another exchange.

U.S. Pat. No. 5,101,451 to Ash et al. discloses a dynamic routing method based upon two or more thresholds associated with the number of trunks that must be available before various services are allowed to use an available trunk in a particular trunk group. A lower threshold is provided to maintain traffic capacity for key services that are below their respective objective loads. A higher threshold is provided to maintain traffic capacity for all services which are below their respective object loads.

U.S. Pat. No. 5,295,183 to Langlois et al. discloses a congestion control method for a telecommunications system based upon the following information: the number of trunks in a considered outgoing trunk group, the number of occupied trunks in the considered outgoing trunk group, the total average call intensity for the considered outgoing trunk group, the average time per conversation, the time period over which the information is collected, and the expected number of idle trunk lines needed in the trunk group for other than alternately routed calls. Employing this information, the most likely alternate routes are determined and stored within switches in the telecommunication system.

SUMMARY OF THE INVENTION

It is an object of the present invention to provide a method of traffic routing in a circuit switched communication network whereby trashing and swapping situations are avoided while a measure of network performance is simultaneously optimized.

Another object of the present invention is to decrease congestion and increase the call completion rate in the circuit switched communication network.

A further object of the present invention is to increase network survivability subject to component failure.

In carrying out the above objects, the present invention provides a method of traffic routing in a circuit switched communication network having a plurality of switches and a plurality of trunk groups connecting the switches. The method includes a step of determining a set of alternate routing paths for each of a plurality of ordered pairs of the switches, wherein the number of alternate routing paths through each of the trunk groups is constrained to be less than a corresponding first predetermined threshold. The method further includes a step of routing a call over one of the alternate routing paths when a direct route for the call is unavailable.

In one embodiment, the alternate routing paths are determined by computing a solution to a predetermined integer programming problem. In another embodiment, a heuristic technique is used to determine the alternate routing paths.

Further in carrying out the above objects, systems are provided which perform the steps of the above-mentioned methods.

These and other features, aspects, and advantages of the present invention will become better understood with regard to the following description, appended claims, and accompanying drawings.

BRIEF DESCRIPTION OF THE DRAWINGS

FIG. 1 is a flow chart of an embodiment of a method of traffic routing in a circuit-switched communication network;

FIG. 2 is a flow chart of another embodiment of a method of traffic routing in a circuit-switched communication network;

FIG. 3 is a flow chart of a heuristic method of determining a set of alternate routing paths;

FIG. 4 is flow chart of a method of routing traffic according to a computed call-to-path assignment distribution;

FIG. 5 is an illustration of a routing table which provides an ordered list of reroute paths; and FIG. 6 is a block diagram of a system architecture in accordance with embodiments of the present invention.

BEST MODE FOR CARRYING OUT THE INVENTION

Briefly, embodiments of the present invention overcome the above-described disadvantages of previous methods by restricting the number of alternate routing paths which contain a given trunk group. In addition, each call is assigned to a path based on a probability distribution determined by a relative availability of paths. As a result, the traffic load is effectively spread onto the entire network.

FIG. 1 is a flow chart of an embodiment of a method of traffic routing in a circuit switched communication network. The circuit switched communication network includes a plurality of switches and a plurality of trunk groups connecting the switches. The method comprises a step of collecting network and traffic status data, as indicated by block 10. The network and traffic status data may include quantities representative of the status of the switches and the trunk groups in the network. For example, switch status data may include a congestion indicator (indicating whether or not the switch is congested) and a failure indicator (indicating whether or not the switch is failed or isolated). Trunk group status information may include a trunk group occupancy quantity representative of an average number of trunks occupied during a predetermined time interval, and a failure indicator indicative of whether or not the trunk group is disconnected or having SS7 signaling problems.

The method further comprises a step of determining a set of alternate routing paths for each of a plurality of pairs of the switches, as indicated by block 12, wherein the number of alternate routing paths through each of the trunk groups is constrained to be less than a corresponding predetermined threshold. The set of alternate routing paths for each pair may be determined using a computer-implemented optimization method for a predetermined performance function based upon the traffic status data. Alternatively, the set of alternate routing paths for each pair may be determined using a heuristic technique which produces a suboptimal result of the predetermined performance function. Regardless of the specific approach employed, the set of alternate routing paths is determined in dependence upon the topology of the network and a set of predetermined control parameters (including the threshold for the number of alternate routing paths).

As indicated by block 14, the method further comprises a step of routing traffic based upon the set of alternate routing paths for each of the ordered pairs of switches. The alternate routing paths offer a number of potential routes for handling overflow or blocked traffic that cannot be carried on a direct trunk.

Traffic is routed according to the set of alternate routing paths for a predetermined time interval until the network and traffic status data is updated. The updated data is provided to the step of block 12 to produce a new set of alternate routing paths. As a result, the routing scheme is updated automatically, typically every few minutes, based upon current network status and usage.

FIG. 2 is flow chart of another embodiment of a method of traffic routing in accordance with the present invention. The method comprises a step of collecting network and traffic status data, as indicated by block 20. Preferably, the data includes a congestion indicator and a failure indicator for each of the switches, and a trunk group occupancy quantity and a failure indicator for each of the trunk groups.

As indicated by block 22, the method further comprises a step of determining a set of feasible paths for each ordered pair of switches. The set of feasible paths for each ordered switch is determined based upon network topology and limitations data, network status data, and user-defined control parameters. The network topology and limitations data includes information on each switching node, such as switch type (e.g., 1AESS, 5ESS, DMS100, etc.) and switch class (e.g., end office, local tandem, etc.). Further included is information on each trunk group such as the switches attached thereto, the group type (e.g., PH, DF, AF, IH), the group size (i.e. the number of trunks currently in the group), and an indicator of whether the trunk group uses SS7 or multi-frequency signaling. Further, any switches and/or trunk groups that cannot be used as part of a routing path for certain switch pairs may be specified.

The user-defined control parameters include a maximum number of via nodes allowed for each routing path. In one embodiment of the invention, this parameter is set equal to unity. Another user-defined control parameter is the maximum number of alternate routing paths allowed for each ordered switch pair, denoted herein by the variable B. In an embodiment, this parameter may be set as any integral value between 0 and 7. A further user-defined control parameter is a trunk group reservation percentage threshold. This threshold is used as follows: if the average usage of a trunk group in a time interval is above the threshold, the trunk group is not used as part of a routing path for other switch pairs. These control parameters are local variables which may be set to different values for different switch pairs or trunk groups.

Another control parameter is a maximum number of routing paths allowed to use a particular trunk group, denoted by the variable Q. In practice, the variable Q is selected between a range of 4B (the average number of alternate routing paths containing a trunk group) and 4n–8 (the maximum number of alternate routing paths containing a trunk group, where n is the number of switches in the network). In order to evenly distribute overflow traffic in the network, Q is preferably chosen to be close to 4B.

In particular, the set of feasible paths for each ordered switch pair may be determined using a plurality of predetermined rules. Preferably, the set of feasible paths, denoted by $P_{ij}$, from a switch i to a switch j is computed based upon input data using the following rules:

(i) beside the direct trunk group, all feasible paths are made of exactly two links;

(ii) a multifrequency link cannot follow an SS7 link in any feasible path;

(iii) a failed or congested switch cannot be used as a via node in any feasible path;

(iv) a failed or troubled trunk group cannot be used as a link in any feasible path; and (v) compliance with user-specified restrictions.

Of course, one having ordinary skill in the art will recognize that other combinations of rules can be formulated based upon network topology and network traffic data. Regardless of the specific rules employed, the set of feasible paths $P_{ij}$ is formed, wherein a feasible path from switch i to switch j via switch k is denoted by $P_{ikj}$.

The method further comprises a step of computing an availability quantity for each of the feasible paths, as indicated by block 24. Preferably, the measure of availability $A_{ikj}$ for the feasible path $P_{ikj}$ is computed using the following equations:

$$A_{ikj}=min\{A_{ij},A_{kj}\},$$

$$A_{ij}=max\{a_{ik}M_{ik}-m_{ik},0\}$$

$$A_{kj}=max\{a_{kj}M_{kj}-m_{kj},0\}.$$

where:

$a_{ij}$ denotes the trunk reservation percentage for the trunk group which connects switch i and switch j, $A_{ij}$ denotes the availability of the trunk group which connects switch i and switch j, $m_{ij}$ denotes the average number of trunks occupied during the previous time interval in the group connecting switch i and switch j, and $M_{ij}$ denotes the number of trunks in the trunk group between switch i and switch j.

As indicated by block 26, the method further comprises a step of computing a set of alternate routing paths for each of the ordered switch pairs. Preferably, all sets of alternate routing paths are computed jointly.

In a first preferred embodiment, the set of alternate routing paths for each of the ordered switch pairs are computed jointly by solving the following integer programming problem.

$$\text{Maximize} \quad \sum_p \frac{A_p}{M_{s(p)}-m_{s(p)}+\epsilon} \cdot x_p$$

$$\text{subject to} \quad \sum_{p \in P_{ij}} x_p \leq B \quad \forall (i,j)$$

$$\sum_p \delta_{ep} \cdot x_p \leq Q \quad \forall e$$

$$x_p \in \{0,1\} \quad \forall p$$

where:

p is an index for a feasible path connecting two switches, $A_p$ is the availability of a feasible path p, $P_{ij}$ is the set of feasible paths from switch i to switch j, $x_p$ is 1 if path p is in the set of alternate routing paths from switch i to switch j, $x_p$ is 0 otherwise, $\delta_{ep}$ is 1 if link e is on path p, $\delta_{ep}$ is 0 otherwise, and $\epsilon$ is a small number usually set less than or equal to 0.01.

The objective of this integer program is to select alternate routing paths with relatively larger availabilities for switch pairs which are more likely to overflow. The first set of constraints restricts the number of alternate routing paths for each switch pair to be less than or equal to B. The second set of constraints insures that each trunk group is not used in more than Q alternate routing paths. This problem can be solved to optimality by a branch-and-bound algorithm using a column generation technique.

In a second preferred embodiment, the set of alternate routing paths are found heuristically using a method illustrated in FIG. 3. In a step indicated by block 40, all switch pairs are listed in increasing order of the availability of the corresponding direct trunk group. A set of alternate routing paths is found sequentially proceeding from the top of the list to the bottom as follows. In a step indicated by block 42, the feasible path having the largest availability which is strictly greater than zero and not containing a link which has been used Q times already is added to the set of alternate routing paths. The step in block 42 is repeated until either the set of alternate routing paths contains B paths or no more paths can be added.

Referring back to FIG. 2, after the alternate routing paths are computed, the method includes a step of determining a call-to-path assignment distribution for each ordered switch pair, as indicated by block 28. Preferably, the call-to-path assignment distribution for each ordered switch pair is computed using the following equation.

$$\beta_p = \frac{A_p}{\sum_{p \in P^*_{ij}} A_p}$$

As indicated by block 30, the method includes a step of routing traffic according to the call-to-path assignment distributions computed in block 28.

FIG. 4 is a flow chart of a method of routing traffic according to a computed call-to-path assignment distribution. As illustrated in block 50, the method includes a step of creating a routing table for each switch pair based upon the call-to-path assignment distribution. The routing table provides an ordered list of reroute paths which are to be sequentially attempted if the direct route is unavailable. An example of such a routing table is illustrated in FIG. 5. In this example, the set of alternate routing paths contains two paths, $p_1$=i-u-j and $p_2$=i-v-j, with an assignment distribution of $\beta_1$=⅓ and $\beta_2$=⅔.

Referring back to FIG. 4, the method further includes a step of attempting the direct route when a call arrives for the switch pair, as indicated by block 52. If the direct route is available, then the call is carried on that trunk group. Otherwise, the set of ordered reroute paths are attempted sequentially as indicated by block 54. The reroute paths are attempted sequentially until the first available path is encountered. The call is carried on the first available path, and an indicator of which reroute path is employed is stored. If all of the reroute paths are attempted unsuccessfully in block 54, then the call is cancelled.

When the next call arrives for the switch pair, the direct route is again attempted. If the direct route is unavailable, the set of ordered reroute paths are attempted sequentially beginning with the reroute path following the one represented by the stored indicator.

The above-described embodiments of methods of traffic routing may be employed in a wide variety of switched communication networks. In particular, the methods of traffic routing are advantageous in circuit-switched routing systems for use in a local telephone network. A system architecture in accordance with embodiments of the present invention is illustrated by the block diagram in FIG. 6.

This embodiment of a circuit-switched routing system may be employed to implement non-hierarchical voice traffic routing in a metropolitan area. The new traffic routing method augments fixed hierarchical routing by using non-tandem circuit switches with available trunk group capacity for use as "via" nodes for carrying overflow traffic. Updates are automatically performed every few minutes based on the status of the network and usage.

A usage data collector 60 collects status and utilization data for circuit switches and trunk groups within a metropolitan span of control 62, i.e., the subnetwork whose routing is being supervised. The data is passed to a circuit-switched dynamic routing (CSDR) platform 64 on a periodic basis. For example, usage data may be passed every 5 minutes, and status information may be passed every 30 seconds. The CSDR platform 64 executes an optimization routine using a set of optimization tuning parameters and specific equipment constraints. The tuning parameters may include the maximum number of "via" nodes, the number of routes which calls should attempt, and a congestion threshold variable for switches and trunk groups, for example. The equipment constraints may include the number of call legs allowed, and the number of switches and trunks within a configuration which cannot be used, for example.

The optimization routine is executed at the end of each data collection interval. This interval may default to the polling interval used, e.g. 5 minutes. The optimization routine returns a set of trunk group routing recommendations. The recommendations are implemented by a platform 66 by use of overflow routing requests utilizing existing pre-established route translations within the span of control. The platform 66 is used to automatically place trunk group reroute requests to the desired switch. In addition to placing overflow reroutes, the platform 66 provides contention resolution with overriding manual reroute controls.

As a result, the network's switch routing tables are optimized at regular intervals based on the current configuration, congestion, and available network components. For a blocked call, a number of potential routes are offered to complete the call, based on the available call carrying capacity at the time of the call. "Via" nodes, which handle overflow or blocked traffic that cannot be carried on a direct trunk, are not restricted to be tandem switches in the present invention. Instead, the platform 66 allows other switches in the metropolitan network to be used as potential "via" nodes for completing a call.

In a preferred embodiment, the CSDR platform 64 includes a topology manager which ensures the integrity of all switch and trunk group configuration information within the span of control by automatically interrogating the switches during initialization of an application. The configuration information is dynamically kept up to date by configuration update notifications.

Further, the CSDR platform 64 preferably includes a routing controller which sends the overflow reroutes based on the recommendations from the optimization routine. The routing controller is responsible for ordering the placing of reroutes, monitoring which reroute controls are already in place, and removing reroute controls which are no longer needed. The routing controller is responsible for removing reroute controls affected by component failures occurring between optimization intervals.

The above-described traffic routing methods and systems maintain the network at an optimal level of utilization. Further, by rerouting calls around failed elements in the network, the methods may be used as a tool to enhance the survivability of the network.

Embodiments of the present invention may be realized using a distributed, layered architecture. The use of a layered, modular component set simplifies the integration of re-use components and off-the-shelf components. Further, the maintenance overhead is reduced by limiting modification impact to well-defined components. The use of a distributable set of components simplifies the configuration for maximum performance, reliability, and redundancy. A single host may execute one or more invocations of CSDR, with one invocation of CSDR existing for each metropolitan area region served. If it becomes necessary to balance CPU loading of all CSDR invocations, data management can be performed by a high-performance server tuned for a database, and CSDR invocations can reside on hosts tuned for network I/O.

CSDR is not an integral run-time component of the network, but rather is a means for placing expansive, overflow reroute controls. As a result, a catastrophic failure of CSDR does not impact call completion within the network. CSDR restart and recovery may be performed automatically by, first, removing all CSDR-placed reroutes within the span of control. Optimization then continues after the first complete status and usage reporting cycle has been completed. Moreover, the CSDR may be disabled, if needed, to recover from a significant network failure (such as mass calling, multi-node failure, or comprehensive SS7 failure).

The ability for quick recovery due to single application instance host failure within the CSDR system is also supported by having the CSDR service utilize spare host capacity to replace a failed server without needing to restart the system. A distributed architecture increases application survivability by spreading CSDR invocations across a number of hosts. A host failure, then, only impacts one span of control. Standby invocations can then take over execution after recognition that one of the CSDR application components have failed.

When an intermediate system failure occurs, i.e., a communication failure between the CSDR 64, the platform 66, and/or network elements, re-synchronization of the CSDR topology is automatic once the failure is corrected. When a communication failures occur with a particular network element, the network element is marked as unavailable for use as a "via" node, and current reroute controls using the element are removed.

While the best modes for carrying out the invention have been described in detail, those familiar with the art to which this invention relates will recognize various alternative designs and embodiments for practicing the invention as defined by the following claims.

What is claimed is:

1. A method of traffic routing in a circuit switched communication network, the circuit switched communication network having a plurality of switches and a plurality of trunk groups connecting the switches, the method comprising the steps of:

determining a set of alternate routing paths for each of a plurality of ordered pairs of the switches, wherein the number of alternate routing paths through each of the trunk groups is constrained to be less than a corresponding first predetermined threshold;

determining a set of feasible paths of each of the ordered pairs of the switches, wherein the set of feasible paths are consistent with a plurality of predetermined rules, and wherein the set of alternate routing paths is a subset of the set of feasible paths;

calculating a measure of availability for each of the feasible paths;

adding a selected path from the set of feasible paths to the set of alternate routing paths if each trunk group in the selected path is less than the first predetermined threshold until the set of alternate routing paths contains a predetermined number of paths; and routing a call over one of the alternate routing paths when a direct route for the call is unavailable.

2. The method of claim 1, wherein the step of determining the set of alternate routing paths includes a step of computing a solution to a pre-determined integer programming problem, wherein the solution of the integer programming problem yields the set of alternate routing paths for each of the ordered pairs of the switches.

3. The method of claim 2, wherein the solution to the pro-determined integer programming problem is computed using a branch-and-bound method.

4. A system for traffic routing in a circuit switched communication network, the circuit switched communication network having a plurality of switches and a plurality of trunk groups connecting the switches, the system comprising:

means for determining a set of alternate routing paths for each of a plurality of ordered pairs of the switches, wherein the number of alternate routing paths through each of the trunk groups is constrained to be less than a corresponding first predetermined threshold;

means for determining a set of feasible paths of each of the ordered pairs of the switches, wherein the set of feasible paths are consistent with a plurality of predetermined rules, and wherein the set of alternate routing paths is a subset of the set of feasible paths;

means for determining a measure of availability for each of the feasible paths;

means for adding a selected path from the set of feasible paths to the set of alternate routing paths if each trunk group in the selected path is less than the first predetermined threshold; and means for routing a call over one of the alternate routing paths when a direct route for the call is unavailable.

5. The system of claim 4, wherein the means for determining the set of alternate routing paths includes means for computing a solution to a pre-determined integer programming problem, wherein the solution of the integer programming problem yields the set of alternate routing paths for each of the ordered pairs of the switches.

6. The system of claim 5, wherein the solution to the pre-determined integer programming problem is computed using a branch-and-bound routine.

\* \* \* \* \*

UNITED STATES PATENT AND TRADEMARK OFFICE
CERTIFICATE OF CORRECTION

PATENT NO. : 5,615,254

DATED : March 25, 1997

INVENTOR(S) : Yuping Qiu, Jennifer Ryan, Xiaorong Sun, George B. Pillsbury, Alex Stevens, Ruby Zibiate It is certified that error appears in the above-identified patent and that said Letters Patent is hereby corrected as shown below:

On the Title Page:

Item [54] "COMUNICATION" should read --COMMUNICATION--.

Signed and Sealed this

Twenty-seventh Day of March, 2001

*Attest:*

NICHOLAS P. GODICI

*Attesting Officer*        *Acting Director of the United States Patent and Trademark Office*